United States Patent Office 2,824,884
Patented Feb. 25, 1958

2,824,884

AMIDES OF PERCHLOROFLUOROCARBOXYLIC ACIDS AND PROCESS FOR THE PREPARATION THEREOF

William S. Barnhart, Cranford, and Joseph L. Zollinger, Bloomfield, N. J., assignors, by mesne assignments, to Minnesota Mining and Manufacturing Company, St. Paul, Minn., a corporation of Delaware No Drawing. Application April 5, 1955
Serial No. 499,512

28 Claims. (Cl. 260—404)

This invention relates to novel amides of perchlorofluorocarboxylic acids and to methods for the preparation thereof.

The novel compounds of this invention may be produced by a number of methods, for example they may be produced by the reaction of a perchlorofluorocarboxylic acid halide or a perchlorofluoropolycarboxylic acid halide with a compound such as ammonia, hydrazine, hydroxylamine, or an organic amine. They may also be produced by the thermal decomposition of the ammonium salt or amine salt of a perchlorofluorocarboxylic acid or polyacid, or by the reaction of perchlorofluorocarboxylic acid esters or anhydrides with ammonia, hydrazine, hydroxylamine, or an organic amine.

The perchlorofluorocarboxylic acid halides or perchlorofluoropolycarboxylic acid halides which may be used as reactants in one method of the present invention are those containing between 4 and about 20 carbon atoms and which are prepared according to the disclosure of copending application Serial No. 499,250, filed April 4, 1955.

These acid halides may be reacted with ammonia, hydrazine, hydroxylamine, or an organic amine. The organic amines which may be used include aliphatic primary mono- and polyamines, such as methylamine, ethylamine, propylamine, trimethylenediamine, ethylenediamine, N,N-diethyl-1,3-propanediamine, 1,2,3-triaminopropane, and the like, and isomers thereof; aliphatic secondary mono- and polyamines, such as methylethylamine, dibutylamine, dipentylamine, N-dimethyl-N'-methylethylenediamine, N,N'-diethyltrimethylenediamine, and the like, and isomers thereof; aromatic primary mono- and polyamines, such as aniline, toluidine, xylidine, alpha-naphthylamine, benzidine, dimethylaniline, p-aminoaniline, 1,3,5-triaminobenzene, and the like, and isomers thereof; aromatic secondary mono- and polyamines, such as diphenylamine, methylaniline, and the like, and isomers thereof; and cyclic and heterocyclic, primary and secondary, mono- and polyamines, such as cyclobutylamine, dicyclohexylamine, pyrrolidine, piperidine, morpholine, and pyrazolidine, and the like. These amines may also be substituted with fluorine, chlorine, bromine, iodine, nitrogen, sulfur, and/or oxygen, i. e., compounds such as amino acids, amino alcohols, and the like. Exemplary of such substituted amines are chloroethylamine, 1,1-dihydrotrifluoroethylamine, 1,1-dihydroheptafluorobutylamine, difluorodibutylamine, methyldibromoethylamine, chlorophenylamine, dibromodiphenylamine, trichlorocyclobutylamine, ethanolamine, colamine, diethanolamine, aminophenol, alpha-aminoglutaric acid, diaminocaproic acid, triaminohexanoic acid, anthranilic acid, phenyl hydrazine, beta-thio-alpha-aminopropionic acid, sulfanilic acid, thiocarbanilide, p-nitroaniline, p-nitroso-N-methylaniline, and the like, and isomers thereof.

Generally speaking, the amides of the invention may be prepared by either of the following procedures, A or B, for effecting the exothermic reaction between the perchlorofluorocarboxylic acid halide or perchlorofluoropolycarboxylic acid halide and an organic amine. The reaction may or may not include the use of a third constituent which acts as an acid acceptor in the reaction.

PROCEDURE A

The perchlorofluorocarboxylic acid halide, or perchlorofluoropolycarboxylic acid halide, and an amine, the latter generally being used in excess, are mixed in an aqueous or non-aqueous system at a temperature between about 0° C. and 100° C., preferably between about 20° C. and 40° C., for a period of a few minutes to about 7 hours. Usually it will be unnecessary to heat the mixture for more than 2 hours, as the product begins to form as soon as the reactants are mixed. An aqueous system is preferred in this reaction, since it is easier to dissipate the heat of reaction and isolate the amide product when this system is used. An excess of amine is preferable in most cases as the excess performs the function of an acid acceptor and effectively removes the hydrogen halide, such as hydrogen chloride, formed as a by-product during the reaction.

The products of the reaction are taken up with an organic solvent, such as methylene chloride, ethyl ether, chloroform, carbon tetrachloride, benzene, and the like. This organic solution of the product is then extracted with a dilute mineral acid, such as hydrochloric acid or sulfuric acid, to remove excess amine, and is finally washed, first with water and then with saturated sodium chloride solution, until the washings are neutral. The organic layer is then dried and the organic solvent is removed by evaporation or distillation. If the product obtained is a solid, it is purified by recrystallization, and if it is a liquid, it is usually distilled.

PROCEDURE B

A basic material may be added to the reactants in the above Procedure A in a quantity between about 0.5 and about 4 molar equivalents per molar equivalent of acid chloride, preferably between about 1 and 2 molar equivalents. This material may be an inorganic acid acceptor, such as aqueous sodium hydroxide, potassium hydroxide, sodium bicarbonate, and the like, in which case the reaction is performed in an aqueous system, or an organic acid acceptor may be used, such as pyridine, dimethylaniline, and the like, in either an aqueous or non-aqueous system.

When an inorganic acid acceptor is used in an aqueous solution, the amide, which may be precipitated from the reaction mixture, is filtered, dried, and recrystallized to obtain a pure product. However, if the amide is a liquid product or a solid which is difficult to filter, it may be extracted with an organic solvent, washed with water, and heated or distilled to remove the solvent. The resulting product may be recrystallized or distilled to yield a pure amide. When an organic acid acceptor, other than the principal reacting amine, is added to the reaction mixture, the procedure for obtaining the pure amide is the same as that described in Procedure A above.

When ammonium hydroxide is reacted with a perchlorofluorocarboxylic acid halide, a primary amide of the type R—CONH$_2$, in which R is a perchlorofluoroalkyl radical, is obtained. An excess of ammonium hydroxide in a molar ratio of between 1.5:1 and 10:1, preferably between 2:1 and 4:1, with respect to the acid halide, is used in an aqueous system.

The molar ratio of perchlorofluoromonocarboxylic acid halide to monoamine in Procedure A is between about 3:1 and about 1:10, preferably between 1:1.5 and 1:6. In Procedure B the molar ratio of perchlorofluoromonocarboxylic acid halide to monoamine is between about 6:1 and 1:10, preferably between 2:1 and 1:4.

If the number of reactive groups in either the acid halide or in the amine is increased, the molar ratio is also correspondingly increased to compensate in favor of the reactant having the fewer number of reacting groups. For example, the molar ratio of reacting —COCl groups to reacting H—N< groups is between about 3:1 and 1:10, preferably between 1:1.5 and 1:6, in Procedure A and between about 6:1 and 1:10, preferably 2:1 and 1:4, in Procedure B.

The amides of the invention can also be prepared by heating the ammonia or amine salt of a perchlorofluoromonocarboxylic acid or perchlorofluoropolycarboxylic acid at temperatures in the range of about 50 to 300° C., the product being purified by crystallization or distillation.

Perchlorofluorocarboxylic acid esters, such as those disclosed in copending application Serial No. 493,554, filed March 10, 1955, are converted by interaction with aqueous or anhydrous ammonia to yield an alcohol and amide of the type

or by interaction with organic amines to yield an alcohol and an amide of the type

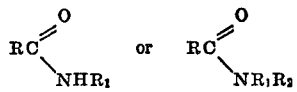

R being a perchlorofluoroalkyl group and $R_1$ and $R_2$ being organic radicals. The temperature in this reaction may be between about 0 and 100° C., and the reaction can be easily effected at room temperature.

Where perchlorofluoropolycarboxylic acid esters are reacted with ammonia or amines, somewhat higher temperatures are sometimes used in the range of about 30 to 200° C. In most cases, an equivalent quantity or an excess of ammonia or amine is desirable in the reaction mixture, and the molar ratio of ammonia or amine groups to ester groups is between 1:1 and 20:1. However, as the number of reacting groups in the amine or in the ester is increased, the ratio is correspondingly increased to compensate in favor of the reactant having the fewer number of reacting groups, unless a perchlorofluoropolycarboxylic acid ester is used in which it is not desired to react all of the carboxyl groups with ammonia or amine, in which case the ester is used in excess.

Perchlorofluorocarboxylic acid esters, when reacted with hydrazine hydrate for a period of not more than 24 hours at temperatures between about 0 and 120° C., yield amides of the type

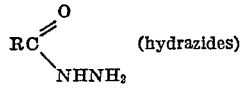 (hydrazides)

The product is purified by recrystallization.

The amides of this invention are useful as chemical intermediates, surfactants, molding lubricants, rust inhibitors, and as plasticizers for polychlorotrifluoroethylene plastic, for example, in a quantity of 5 to 30 parts by weight per 100 parts of polychlorotrifluoroethylene.

The invention will be further illustrated by reference to the following specific examples:

Example 1

PREPARATION OF

$Cl(CF_2—CFCl)_3CF_2COCl$ (0.2 mole) was added in portions to 0.2 mole of $H_2NCH_2CH_2N(C_2H_5)_2$ in 90 ml. of 10 percent aqueous sodium hydroxide. After the exothermic reaction had subsided, the cooled mixture was extracted with methylene chloride. The organic layer was washed with a saturated solution of sodium chloride, treated with anhydrous calcium sulfate and evaporated in a stream of nitrogen. The yield of crude red-orange product was 0.198 mole (99 percent). $n_D^{21}=1.4318$. $d_4^{20}=1.580$. Attempts at vacuum distillation resulted in decomposition.

Analysis.—Calc'd for $C_{15}H_{17}ON_2Cl_4F_{11}$: N, 4.73. Found: N, 4.62.

Example 2

PREPARATION OF $Cl(CF_2—CFCl)_3CF_2CONHC_6H_4SO_3Na$ $Cl(CF_2—CFCl)_3CF_2COCl$ (0.2 mole) was added in portions to 0.2 mole of sulfanilic acid in 160 ml. of 10 percent aqueous sodium hydroxide. Additional sodium hydroxide solution was added until, after shaking, the mixture was neutral. The mixture was cooled, filtered and the white product was dried for 48 hours in a vacuum desiccator. The crude yield was 0.18 mole (90 percent). The product was recrystallized from about a 33 percent saturated sodium chloride solution to give white crystals, M. P. 215–220° C. (dec.). The compound is very soluble in water and gives a copious, stable foam on shaking.

Example 3

PREPARATION OF $Cl(CF_2—CFCl)_3CF_2CON(CH_2CH_2OH)_2$ (A) $Cl(CF_2—CFCl)_3CF_2COCl$ (0.05 mole) was added with stirring to 0.1 mole of diethanolamine. Heat was evolved. A clear, nearly colorless viscous syrup resulted after the reaction mixture stood overnight. A filtered 1 percent aqueous solution (cloudy) of this material had a surface tension of 26 dynes/cm.

(B) $Cl(CF_2—CFCl)_3CF_2COCl$ (0.2 mole) was added to 0.45 mole of diethanolamine in about 150 ml of water. The hot mixture was swirled intermittently and was allowed to stand overnight. Solid ammonium sulfate was added and the mixture was extracted several times with ether. The organic layer was treated with anhydrous calcium sulfate, filtered and evaporated in a stream of nitrogen. The crude yield after drying was 0.17 mole; 84 percent. Recrystallization from water gave small white flakes, M. P. 185–190° C. dec. (softening above 165° C.). Recrystallization from xylene-dimethylformamide or xylene-1,4-dioxane afforded large white flakes.

Analysis.—Calc'd for $C_{12}H_{10}O_3NCl_4F_{11}$: N, 2.47. Found: N, 2.49.

Example 4

PREPARATION OF $[Cl(CF_2—CFCl)_3CF_2CONH—CH_2]_2$

Ethylenediamine (1.67 ml.; 0.025 mole) was added carefully to 13.4 ml. (0.05 mole) of ice cold

A vigorous reaction ensued with evolution of heat and white vapors. The pale amber solid was triturated with cyclohexane, filtered, and washed with water. The product was recrystallized from methanol to give fine, shiny crystals, M. P. 148–150° C.

Analysis.—Calc'd for $C_{18}H_6O_2N_2Cl_8F_{22}$: N, 2.85. Found: N, 2.81.

Example 5

PREPARATION OF $Cl(CF_2—CFCl)_3CF_2CONH_2$

To excess ice cold concentrated aqueous ammonia were added 10 grams of $Cl(CF_2—CFCl)_3CF_2COCl$. The white solid thus formed was filtered, washed with water and dried to give 10 grams of crude white amide, M. P. 77–79° C. Recrystallization from petroleum ether (30–75° C.) afforded white needles, M. P. 82–84° C.

Analysis.—Calc'd for $C_8H_2ONCl_4F_{11}$: N, 2.92. Found: N, 2.63 and 2.85.

Example 6

PREPARATION OF
Cl(CF$_2$—CFCl)$_3$CF$_2$CONHCH$_2$CH(C$_2$H$_5$)(CH$_2$)$_3$CH$_3$

Cl(CF$_2$—CFCl)$_3$CF$_2$COCl (0.2 mole) was added slowly with swirling to 0.41 mole of

CH$_3$(CH$_2$)$_3$CH(C$_2$H$_5$)CH$_2$NH$_2$

Heat was evolved. After standing overnight, the amber liquid was shaken with dilute HCl and extracted with CH$_2$Cl$_2$. The organic layer was washed several times with dilute HCl and then with saturated NaCl solution until the washings were neutral. The organic layer was treated with anhydrous calcium sulfate and evaporated to yield 0.175 mole (87 percent conversion) of an amber oil. $n_D^{20}$=1.4355. $d_4^{20}$=1.416.

*Analysis.*—Calc'd for C$_{16}$H$_{18}$ONCl$_4$F$_{11}$: N, 2.37. Found: N, 2.52 and 2.70.

Example 7

PREPARATION OF THE AMMONIUM SALT OF C$_9$ TELOMER ACID

A 48 gram portion (0.1 mole) of

Cl(CF$_2$—CFCl)$_3$CF$_2$COOH was mixed with 100 ml. of water and neutralized to a pH of about 8 with 15 percent ammonium hydroxide. The salt was completely soluble when warmed. The mixture was evaporated to dryness on a hot plate and dried in an oven at a temperature of 105° C. for 24 hours. A yield of 47.5 grams was obtained.

Example 8

PREPARATION OF Cl(CF$_2$—CFCl)$_3$CF$_2$CONHOH

To 8.0 grams (0.11 mole) of hydroxylamine hydrochloride in 40 ml. of 10 percent aqueous NaOH was added, gradually, 50 grams (0.10 mole; 28 ml.) of Cl(CF$_2$—CFCl)$_3$CF$_2$COCl with swirling and cooling. Aqueous NaOH was added to maintain basicity. Within 0.5 hour the reaction was completed and the mixture was acidified and extracted twice with ether. The ether extract was washed with water, dried over anhydrous calcium sulfate, removing the ether in a nitrogen stream, and was finally dried in a vacuum desiccator. The amide was crystallized from cyclohexane to give 18 grams (0.036 mole; 36 percent) of fine needles, M. P. 81–83° C. A pure sample of amide melting at 84.0–84.5° C. was obtained. The product gives a dark red color with alcoholic ferric chloride and is insoluble in 5 percent NaHCO$_3$, but soluble in dilute NaOH and hot water.

*Analysis.*—Calc'd for C$_8$H$_2$O$_2$NCl$_4$F$_{11}$: N, 2.83. Found: N, 2.95 and 2.78.

Example 9

PREPARATION OF 1,2,4-TRICHLOROOCTAFLUOROHEXANAMIDE OF p,p'-DIAMINODIPHENYLMETHANE

A mixture of 0.05 mole of p,p'-diaminodiphenylmethane and about 0.1 mole of Cl(CF$_2$—CFCl)$_2$CF$_2$COOH are mixed in a vessel and heated at about 150–200° C. for an hour, or until water ceases to be evolved. The product is then recrystallized from a mixture of benzene and methanol to a constant melting point.

Example 10

PREPARATION OF Cl(CF$_2$—CFCl)$_4$CF$_2$CONHNH$_2$

Cl(CF$_2$—CFCl)$_4$CF$_2$COOCH$_3$ (0.1 mole) and hydrazine hydrate (1.5 mole) are heated in a flask equipped with a reflux condenser at a temperature not exceeding 120° C. for a period of 3 hours. The product is filtered, washed with water and dried. The product is obtained in about a 75 percent yield.

Example 11

PREPARATION OF Cl(CF$_2$—CFCl)$_3$CF$_2$CONHOH

To 0.07 mole of hydroxylamine hydrochloride in 25 ml. of methyl alcohol is added 0.1 mole of KOH in 15 ml. of methyl alcohol, with cooling. The KCl precipitates out. Cl(CF$_2$—CFCl)$_3$CF$_2$COOCH$_2$CH$_3$ (0.35 mole) is then added and shaken with the solution. The mixture is filtered immediately by suction and the filtrate allowed to stand for 2 days to permit crystallization. The crystals are filtered from solution and shaken with a mixture of ether and 5 percent HCl, and the ether layer is washed with water until neutral and is then evaporated. The residue is recrystallized from cyclohexane. The product is obtained in about a 40 percent yield.

Example 12

PREPARATION OF Cl(CF$_2$—CFCl)$_2$CF$_2$CONH$_2$

To an excess of concentrated aqueous ammonia is added 0.1 mole of [Cl(CF$_2$—CFCl)$_2$CF$_2$CO]$_2$O, and the mixture allowed to stand for about 6 hours. The precipitate which forms is filtered, washed with water and dried to give a crude product. Recrystallization from petroleum ether affords white needles in about an 80 percent yield.

The anhydrides, although more sluggish, react under conditions similar to the acid halides in the invention, the only difference being that in some cases they may require a slightly higher reaction temperature than the acid halides.

It will be obvious to those skilled in the art that many modifications may be made within the scope of the present invention without departing from the spirit thereof, and the invention includes all such modifications.

We claim:

1. An amide of a perchlorofluorocarboxylic acid having from 4 to 20 carbon atoms.

2. An amide of a perchlorofluoromonocarboxylic acid having from 4 to 20 carbon atoms.

3. A diamide of a perchlorofluorodicarboxylic acid having from 4 to 20 carbon atoms.

4. A polyamide of a perchlorofluoropolycarboxylic acid having from 4 to 20 carbon atoms.

5. A compound having the formula $$Z(CF_2-CFCl)_{n-1}CF_2\overset{O}{\overset{\|}{C}}-N\overset{R}{\underset{R_1}{\diagdown}}$$

in which Z is selected from the group consisting of chlorine and perhalomethyl radicals having a total atomic weight not in excess of 146.5, $n$ is an integer from 2 to 10, R and R$_1$ are selected from the group consisting of hydrogen, lower alkyl, lower hydroxy alkyl and monocyclic aryl, and wherein one of R and R$_1$ are amino, hydroxyl and the other is hydrogen and having not in excess of 20 carbon atoms, and wherein $$N\overset{R}{\underset{R_1}{\diagdown}}$$

is selected from methylene diamine, p-p'-diaminodiphenylmethane, sulfanilic acid and the diethylaminoethylamino group.

6. A compound having the formula $$Cl(CF_2-CFCl)_{n-1}CF_2\overset{O}{\overset{\|}{C}}-N\overset{R}{\underset{R_1}{\diagdown}}$$

in which $n$ is an integer from 2 to 10, and R and R$_1$ are lower alkyl radicals having not in excess of 20 carbon atoms.

7. A compound having the formula $$Cl(CF_2-CFCl)_{n-1}CF_2\overset{O}{\overset{\|}{C}}-N\overset{R}{\underset{R_1}{\diagdown}}$$

in which $n$ is an integer from 2 to 10, and R and R$_1$ are hydrogen.

8. A compound having the formula

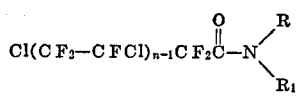

in which $n$ is an integer from 2 to 10, and R and $R_1$ are monocyclic aryl radicals having not in excess of 20 carbon atoms.

9. A compound having the formula

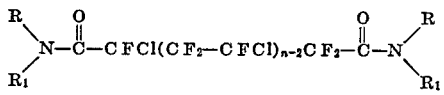

in which $n$ is an integer from 2 to 8, and R and $R_1$ are lower alkyl radicals having not in excess of 20 carbon atoms.

10. A compound having the formula

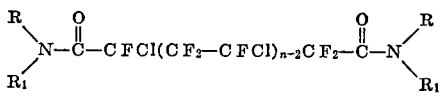

in which $n$ is an integer from 2 to 8, and R and $R_1$ are hydrogen.

11. A compound having the formula

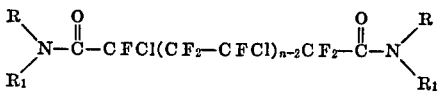

in which $n$ is an integer from 2 to 8, and R and $R_1$ are monocyclic aryl radicals having not in excess of 20 carbon atoms.

12. A compound having the formula

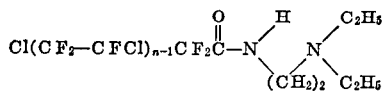

in which $n$ is an integer from 2 to 10.

13. A compound having the formula

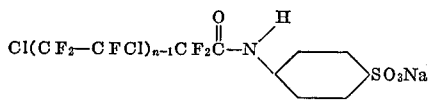

in which $n$ is an integer from 2 to 10.

14. A compound having the formula

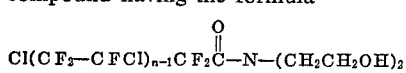

in which $n$ is an integer from 2 to 10.

15. A compound having the formula

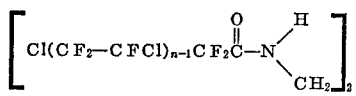

in which $n$ is an integer from 2 to 10.

16. A compound having the formula

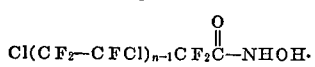

in which $n$ is an integer from 2 to 10.

17. A process which comprises reacting a perchlorofluorocarboxylic acid halide having from 4 to 20 carbon atoms with a compound selected from the group consisting of ammonia, hydrazine, hydroxylamine, methylene diamine, p-p'-diaminodiphenylmethane, sulfanilic acid and lower alkyl amines.

18. A process which comprises reacting a perchlorofluoromonocarboxylic acid halide having from 4 to 20 carbon atoms with a compound selected from the group consisting of ammonia, hydrazine, hydroxylamine, methylene diamine, p,p'-diaminodiphenylmethane, sulfanilic acid and lower alkyl amines.

19. A process which comprising reacting a perchlorofluorodicarboxylic acid halide having from 4 to 20 carbon atoms with a compound selected from the group consisting of ammonia, hydrazine, methylene diamine, p,p'-diaminodiphenylmethane, sulfanilic acid and lower alkyl amines.

20. A process which comprises reacting a perchlorofluoropolycarboxylic acid halide having from 4 to 20 carbon atoms with a compound selected from the group consisting of ammonia, hydrazine, hydroxylamine, methylene diamine, p,p'-diaminodiphenylmethane, sulfanilic acid and lower alkyl amines.

21. A process which comprises reacting a compound having the formula

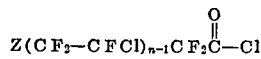

in which Z is selected from the group consisting of chlorine and perhalomethyl radicals having a total atomic weight not in excess of 146.5, and $n$ is an integer from 2 to 10, with a compound having the formula $NHRR_1$ in which R and $R_1$ are selected from the group consisting of hydrogen, lower alkyl, lower hydroxy alkyl and monocyclic aryl, and wherein one of R and $R_1$ are amino, hydroxyl and the other is hydrogen and having not in excess of 20 carbon atoms, and wherein

is selected from methylene diamine, p,p'-diaminodiphenylmethane, sulfanilic acid and the diethylaminoethylamino group.

22. A process which comprises reacting a compound having the formula

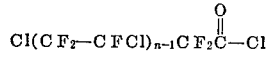

in which $n$ is an integer from 2 to 10, with a compound having the formula $NHRR_1$ in which R and $R_1$ are selected from the group consisting of hydrogen, lower alkyl, lower hydroxy alkyl and monocyclic aryl, and wherein one of R and $R_1$ are amino, hydroxyl and the other is hydrogen and having not in excess of 20 carbon atoms, and wherein

is selected from methylene diamine, p,p'-diaminodiphenylmethane, sulfanilic acid and the diethylaminoethylamino group.

23. A process which comprises reacting a compound having the formula

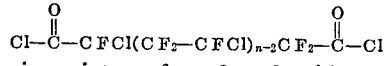

in which n is an integer from 2 to 8, with a compound having the formula $NHRR_1$ in which R and $R_1$ are selected from the group consisting of hydrogen, lower alkyl, lower hydroxy alkyl and monocyclic aryl, and wherein one of R and $R_1$ are amino, hydroxyl and the other is hydrogen and having not in excess of 20 carbon atoms, and wherein

is selected from methylene diamine, p,p'-diaminodiphenylmethane, sulfanilic acid and the diethylaminoethylamino group.

24. A process which comprises reacting a compound selected from the group consisting of a perchlorofluorocarboxylic acid halide, ester and anhydride having from 4 to 20 carbon atoms with a compound selected from the group consisting of ammonia, hydrazine, hydroxylamine, methylene diamine, p,p'-diaminodiphenylmethane, sulfanilic acid and lower alkyl amines.

25. A process which comprises reacting a perchlorofluorocarboxylic acid halide having from 4 to 20 carbon atoms with hydroxylamine.

26. A process which comprises reacting a perchlorofluorocarboxylic acid halide having from 4 to 20 carbon atoms with methylene diamine.

27. A process which comprises reacting a perchlorofluorocarboxylic acid halide having from 4 to 20 carbon atoms with a compound selected from the group consisting of ammonia, hydrazine, hydroxylamine, methylene diamine, p,p'-diaminodiphenylmethane, sulfanilic acid and lower alkyl amines at a temperature between about 0° C. and 100° C.

28. A process which comprises reacting a perchlorofluorocarboxylic acid halide having from 4 to 20 carbon atoms with a compound selected from the group consisting of ammonia, hydrazine, hydroxylamine, methylene diamine, p,p'-diaminodiphenylmethane, sulfanilic acid and lower alkyl amines at a temperature between about 20° C. and 40° C.

References Cited in the file of this patent

UNITED STATES PATENTS

| | | |
|---|---|---|
| 2,514,473 | Chaney | July 11, 1950 |
| 2,593,737 | Diesslin et al. | Apr. 22, 1952 |
| 2,691,043 | Husted et al. | Oct. 5, 1954 |

---

UNITED STATES PATENT OFFICE
CERTIFICATE OF CORRECTION

Patent No. 2,824,884            February 25, 1958

William S. Barnhart et al.

It is hereby certified that error appears in the printed specification of the above numbered patent requiring correction and that the said Letters Patent should read as corrected below.

Column 8, line 1, after "hydrazine," insert -- hydroxylamine, --.

Signed and sealed this 5th day of August 1958.

(SEAL)
Attest:

KARL H. AXLINE
Attesting Officer

ROBERT C. WATSON
Commissioner of Patents

UNITED STATES PATENT OFFICE
CERTIFICATE OF CORRECTION

Patent No. 2,824,884                          February 25, 1958

William S. Barnhart et al.

It is hereby certified that error appears in the printed specification of the above numbered patent requiring correction and that the said Letters Patent should read as corrected below.

Column 8, line 1, after "hydrazine," insert -- hydroxylamine, --.

Signed and sealed this 5th day of August 1958.

(SEAL)
Attest:

KARL H. AXLINE
Attesting Officer

ROBERT C. WATSON
Commissioner of Patents